Dec. 15, 1942.   E. MAZUR   2,305,302
FLUID PRESSURE BRAKE APPARATUS
Filed Aug. 14, 1940   3 Sheets-Sheet 2

Inventor
Erwin Mazur
By
Sommers & Young
Attorneys

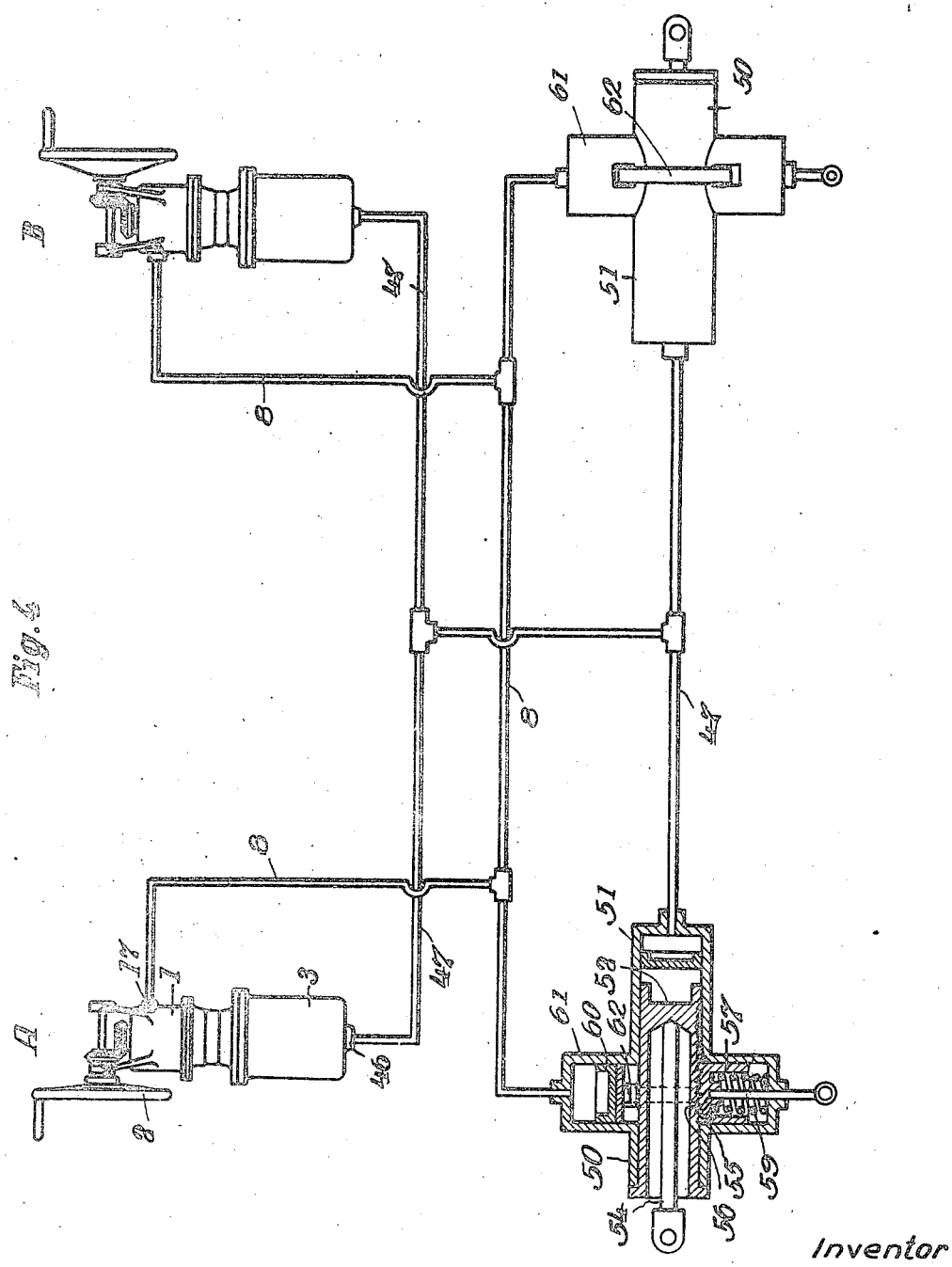

Patented Dec. 15, 1942

2,305,302

UNITED STATES PATENT OFFICE 2,305,302

FLUID PRESSURE BRAKE APPARATUS

Erwin Mazur, Frankfort-on-the-Main, Germany; vested in the Alien Property Custodian Application August 14, 1940, Serial No. 352,623
In Germany September 26, 1939

4 Claims. (Cl. 188—151)

The invention relates to a pressure-fluid brake-operating system having a mechanical locking apparatus. In such brake mechanisms it is necessary that the mechanical lock be disengaged before the brake is released, this being done in known apparatus by means of an auxiliary device which is actuated individually and is suitably connected with a manual operating member, for example a hand-wheel, so that when the manual operating device is actuated for releasing the brake the lock is first rendered inoperative and only then is the brake releasing movement begun. In brake apparatus of this known type the manual operating member is arranged so that when it is moved in one or the other direction it first actuates the lock, then the pressure piston and therewith the brake piston, so that the braking pressure is produced or released according to the direction in which the piston moves.

An arrangement has also been provided in which one of the two pistons telescopically encompassed the other or its piston-rod-like extension, which resembles a hollow piston. With this well-known mechanism the power is applied through a clutch system, the most essential parts of which are two gears with opposed teeth disposed on the shaft of the hand-wheel, and by means of which, through a pair of pawls, the power can be applied to the pressure piston and to the release piston independently of each other.

An object of the present invention is to provide a construction of a braking apparatus having a lock release in which the well-known clutch system is omitted. According to the invention this is accomplished by providing for actuation of the pressure piston of the brake circuit as well as the release piston of the lock mechanism from the manual operating member, the power being transmitted through spindles arranged successively in power-transmission circuit and the movement of the spindles being controlled by the surface pressure of screw threads formed thereon, the pressure being determined by the fluid pressure loading acting on corresponding pistons.

The invention is explained in more detail hereinafter, reference being had to the accompanying drawings illustrating two embodiments of the invention by way of example only.

Figure 1:
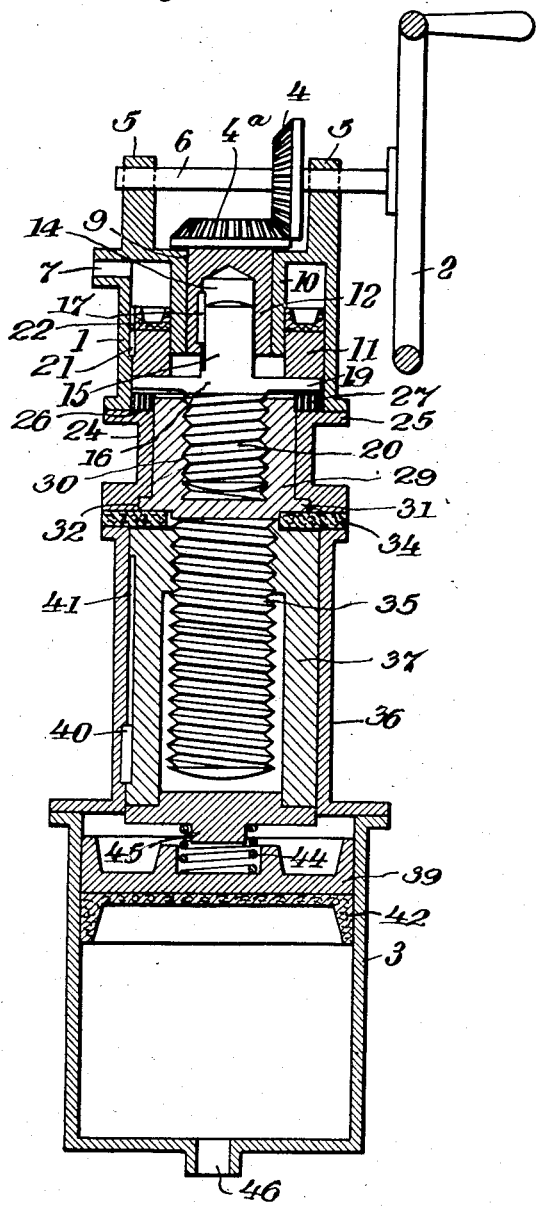
Figure 2:
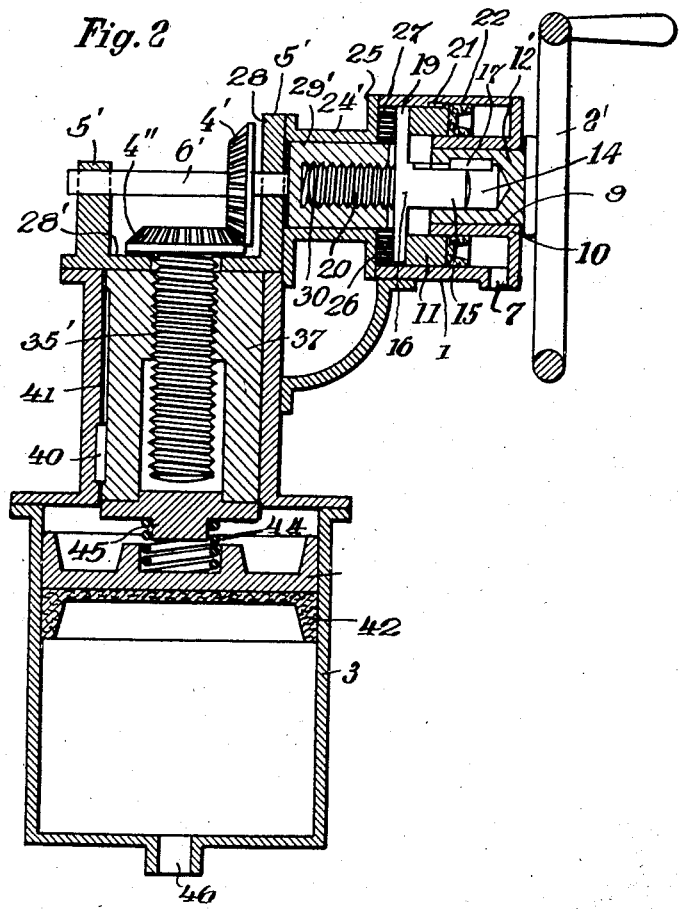
Figure 3:
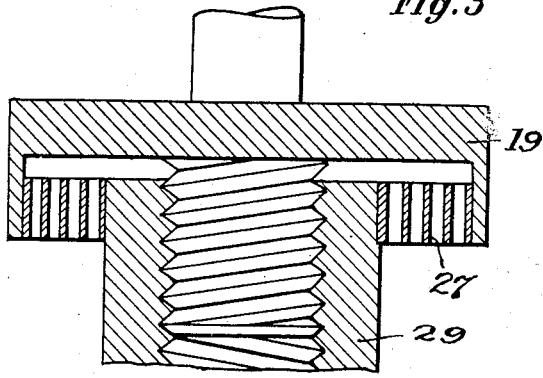

In the drawings, Figs. 1 and 2 are vertical sectional views of two different embodiments of brake-system actuating apparatus according to the invention; Fig. 3 is a cross-sectional view of a detail of Figs. 1 and 2 on enlarged scale; and Fig. 4 shows the entire system diagrammatically.

The brake-actuating mechanism illustrated in Fig. 1 comprises in general an annular releasing-pressure cylinder 1, a manually operable force-applying device in the form of hand-wheel 2, a brake-pressure cylinder 3, and a mechanical coupling mechanism extending from hand-wheel 2 to the piston of cylinder 3 through the central portion of cylinder 1 and its annular piston.

At the upper end of cylinder 1 a pair of bearings 5 are formed or mounted for carrying the shaft 6 of hand-wheel 2. The upper end portion of cylinder 1 is provided with a fluid opening 7 for connection with brake-releasing conduits 8 (Fig. 4), and the upper end wall of cylinder 1 has a central circular opening 9 of considerable size. From the edge of opening 9 a cylindrical flange 10 extends downwardly within cylinder 1 but terminates short of the lower end of cylinder 1. The outer surface of this cylindrical flange 10 serves as the inner cylinder surface for annular piston 11 within cylinder 1. The inner opening of flange 10 serves as a sleeve bearing for the hollow hub 12 of a bevel gear 4a which meshes with another bevel gear 4 mounted on shaft 6.

Within the axially extending bore 14 of hollow hub 12 is located the upper portion 15 of a spindle 16. This upper portion of the spindle is axially slidable relative to the hub 12 but is locked against turning relative thereto by key-and-slot device 17. The intermediate portion of spindle 16 is provided with a flange 19 extending outwardly beneath annular piston 11 of the releasing cylinder 1. The lower portion 20 of spindle 16 extends downwardly from the flange portion coaxially with the upper portion 15 and is formed with screw threads. Annular piston 11 is restrained against rotation by key 21 located in slots in said piston and in the wall of cylinder 1. The upper surface of piston 11 is provided with a packing washer 22.

Below the cylinder 1 is coaxially arranged a cylindrical housing 24 which may be of somewhat smaller diameter than cylinder 1, and is provided with an outwardly-extending flange 25 at its upper edge which is joined to the lower end of cylinder 1. The inner portion 26 of this flange serves as a shelf on which rests a spiral spring 27 which has its outer end attached to the edge of flange 19 (see enlarged view Fig. 3), and its other end attached to spindle nut 29. The upper portion of spindle nut 29 fits within housing 24 and is provided with a downwardly-extending bore 30 provided with screw threads, and the lower portion 20 of spindle 16 extends into this bore and its threads cooperate with the threads thereof.

At its intermediate part, spindle nut 29 is provided with a flange 31 which projects into a groove formed by a recess 32 cut out of the housing and a packing washer 34. The lower portion of spindle nut 29 is in the form of a central downwardly-extending screw 35.

Beneath housing 24 and in axial alinement therewith is a guide housing 36 accommodating a shank 37 of piston 39. This shank has a central screw-threaded bore into which screw 35 engages. The shank is prevented from turning in housing 36 by key device 40, but is able to move axially therein by reason of the extensive length of the key slot 41 formed therein.

At the lower end of guide housing 36 is arranged a brake-pressure cylinder 3 in which is slidably disposed the piston 39 having packing cup 42 on its lower face. Its upper face is formed with a socket in which a portion of coil spring 44 is retained. The upper end of this spring engages around a projection 45 on the bottom face of shank 37. This permits a certain amount of resilient lost motion between the piston and its shank to allow for volume differences due to temperature fluctuation and the like.

The lower portion of cylinder 3 is provided with an opening 46 adapted for connection with the fluid conduits 47 (Fig. 4) of the brake-applying system.

In Fig. 4 the braking system in general is diagrammatically shown and one of the braking motors 50 is shown in section. This motor comprises a brake-applying cylinder 51 having a piston 52 which drives a brake rod 54 to apply the brakes (not shown). One side portion of the piston is provided with locking teeth 55 which cooperate with teeth 56 on locking plunger 57, which is spring-pressed into locking position by spring 59. Plunger 57 is connected with piston 60 in releasing motor 61 by a yoke 62 which extends around cylinder 50, whereby when piston 60 moves forward, the teeth 56 disengage teeth 55 and the piston 52 is free to return to brake-releasing position when the braking fluid pressure is released.

In Fig. 2 the embodiment shown is different from that of Fig. 1 only in that the bevel gears 4, 4a and shaft 6 between wheel 2 and cylinder 1 of Fig. 1 are omitted, the cylinder 1 in this case lying horizontally and the wheel 2' being connected directly to a hollow hub-like member 12' which serves the same purpose as hub 12 of Fig. 1. However, as the cylinder 1 and housing 24' with the upper portion of the spindle nut 29' lie at right angles to the lower portion of the mechanism, the bevel gears 4' and 4" and shaft 6' are provided intermediate these elements. The shaft 6' is connected with spindle nut 29', and gear 4" is connected directly to screw 35'. Also it will be observed that the end covers 28, 28' eliminate the necessity for flange 31, recess 32, and washer 34, as these covers serve the same purpose of holding spindle nut 29' against longitudinal sliding. The principle of operation and connection with the other parts of the system are the same as in Fig. 1.

The operation of the apparatus according to Fig. 1 is as follows:

If the hand-wheel 2, for example at the driver's position A, is turned in the clockwise direction, as if looking from the right, this movement is transmitted through the shaft 6 and bevel gears 4, 4a and the hub 12 to the upper portion 15 of spindle 16. Spindle 16 is locked against turning relative to hub 12 by the key 17. The movement is then transmitted through the spindle nut 29 to its lower screw portion 35 and to the shank 37 of the pressure-applying piston 39, which is consequently moved downwardly. Piston 39 thereby forces the pressure fluid out of cylinder 3, through opening 46, to the braking motor 51 (Fig. 4).

If hand-wheel 2 is turned in the opposite direction, for the purpose of releasing the brake, movement is again transmitted through bevel gears 4, 4a to the screw-threaded lower portion 20 of spindle 16. As a result of the pressure acting on piston 39 and the friction resulting from the surface pressure of the thread of screw 35 in the thread of the shank 37 of piston 39, these two parts are held against relative turning, so that when hand-wheel 2 is turned, the lower portion 20 of spindle 16 is first turned out of the nut 29 and its upper part 15 moves upwardly in the bevel gear hub 12. Thereby, piston 11, which freely contacts the annular flange 19 of spindle 16, is likewise raised and thereby forces the pressure fluid out of cylinder 1 through the opening 7 to the lock-releasing motor 61 (see Fig. 4), so that the teeth 55, 56 of the locking device are disengaged. After the locking plunger is disengaged and the lock-releasing motor piston has moved against the end of the brake cylinder, an excess pressure arises in the releasing circuit, which pressure acts on the face of release piston 11 and has the effect of acting through piston 11 and flange 19 on spindle 16 and creates a powerful surface pressure on the thread of the lower portion 20 of spindle 16. If this surface friction is greater than that between screw 35 and shank 37 of piston 39, the spindle is moved, whereby the piston 39 is moved upwardly, the braking pressure thus being released.

If the brake and also the hand-wheel 2 are released, and the spindle flange 19 is rotated by the brake releasing turning movement of spindle 16, the spring 27 is thereby tensioned, and when the force causing the brake releasing movement is released, the spring 27 moves spindle flange 19 and its spindle through a reverse movement whereby spindle portion 20 turns in nut 29. By this movement the release pump piston 11 is again moved downwardly and thus the hydraulic pressure in the release circuit is again released, so that the locking mechanism, after the brake is applied, can again be operated from the other driver's position B.

The embodiment shown on Fig. 2 operates in the same manner as above described, the only difference being that the hub-like member 12', which is held against axial movement relative to flange 10 by any suitable means (not shown) or even by the operator grasping wheel 2' is actuated directly from the hand-wheel and that the power is transmitted from the spindle nut 29' to the screw 35', through a pair of bevel gears 4', 4" disposed between the two.

I claim:

1. In a fluid-pressure brake-operating system, a braking pressure-applying pump, a brake-applying motor connected with said pump to receive and return pressure fluid, said motor having a piston, a locking device for connection and disconnection with said piston to lock the brakes in applied position and release the brakes, a motor for operating said locking device to release the lock, a brake-releasing pump connected with said releasing motor for supplying pressure fluid to said releasing motor when the brakes are to be released, a common manually operable means for actuating both said brake-applying pump and said brake lock-releasing pump, actuating force transmitting means between said manual means and said pumps comprising a pair of screw-threaded spindles, means engaging the screw threads of said spindles thereby forming screw connections, means for applying the pressure in the brake-applying pump through one of said screw connections, means for applying the pressure of the brake-releasing pump to the other screw-threaded connection, whereby the friction present in said connections depends on the pressure existing in the respective pumps, said screw-threaded spindles being arranged in mechanical power transmission succession, whereby when a brake-releasing movement is applied to the manual actuating means the spindle threads to which the pressure of the brake-releasing motor is applied are moved first and the lock-releasing pump is actuated to apply pressure to the lock-releasing motor before the other screw-threaded spindle is actuated, whereby the brake lock is released before the braking pressure is released.

2. In a fluid-pressure brake-operating system, a braking pressure-applying pump, a brake-applying motor connected with said pump to receive and return pressure fluid, said motor having a piston, a locking device for connection and disconnection with said piston to lock the brakes in applied position and release the brakes, a motor for operating said locking device to release the lock, a brake-releasing pump connected with said releasing motor for supplying pressure fluid to said releasing motor when the brakes are to be released, a common manually operable means for actuating both said brake-applying pump and said brake lock-releasing pump, mechanical actuating force transmission means between said manual actuating means and said pumps, said transmission means comprising a housing, a spindle in said housing having a screw-threaded extended portion, and having a nut portion provided with a central screw-threaded bore, means for restraining said spindle against longitudinal sliding movement in said housing, a slidable spindle having a screw-threaded extension engaging the screw threads of said nut, said slidable spindle having an outwardly extending flange engaging with one face the piston of the lock-releasing pump, the piston of the braking pressure pump having a shank provided with screw threads engaging the screw thread of the extending portion of the non-slidable spindle, the pressure existing in the brake-applying pump being applied to the screw connection between the non-slidable spindle and the shank of the piston of said brake-applying pump and the pressure in the brake-releasing pump being applied to the screw connection between the slidable spindle and the nut of the non-slidable spindle, whereby the relative friction between said screw threads depends on the pressure in said pumps, means for applying the manual actuating force to the slidable spindle, whereby when a brake-releasing movement is applied to the actuating means the spindle threads to which the pressure of the brake-releasing motor is applied are moved first and the lock-releasing pump is actuated to apply pressure to the lock-releasing motor before the other screw-threaded spindle is actuated, whereby the brake lock is released before the braking pressure is released.

3. In a fluid-pressure brake-operating system, a braking pressure-applying pump, a brake-applying motor connected with said pump to receive and return pressure fluid, said motor having a piston, a locking device for connection and disconnection with said piston to lock the brakes in applied position and release the brakes, a motor for operating said locking device to release the lock, a brake-releasing pump connected with said releasing motor for supplying pressure fluid to said releasing motor when the brakes are to be released, a common manually operable means for actuating both said brake-applying pump and said brake lock-releasing pump, mechanical actuating force transmission means between said manual actuating means and said pumps, said transmission means comprising a housing, a spindle in said housing having a screw-threaded extended portion, and having a nut portion provided with a central screw-threaded bore, means for restraining said spindle against longitudinal sliding movement in said housing, a slidable spindle having a screw-threaded extension engaging the screw threads of said nut, said slidable spindle having an outwardly extending flange engaging with one face the piston of the lock-releasing pump, the piston of the braking pressure pump having a shank provided with screw threads engaging the screw thread of the extending portion of the non-slidable spindle, a coil spring between said braking pump piston and said shank for minimizing the effect of variations of fluid volume in the brake-applying system, the pressure existing in the brake-applying pump being applied to the screw connection between the non-slidable spindle and the shank of the piston of said brake-applying pump and the pressure in the brake-releasing pump being applied to the screw connection between the slidable spindle and the nut of the non-slidable spindle, whereby the relative friction between said screw threads depends on the pressure in said pumps, means for applying the manual actuating force to the slidable spindle, whereby when a brake-releasing movement is applied to the actuating means the spindle threads to which the pressure of the brake-releasing motor is applied are moved first and the lock-releasing pump is actuated to apply pressure to the lock-releasing motor before the other screw-threaded spindle is actuated, whereby the brake lock is released before the braking pressure is released.

4. In a fluid-pressure brake-operating system, a braking pressure-applying pump, a brake-applying motor connected with said pump to receive and return pressure fluid, said motor having a piston, a locking device for connection and disconnection with said piston to lock the brakes in applied position and release the brakes, a motor for operating said locking device to release the lock, a brake-releasing pump connected with said releasing motor for supplying pressure fluid to said releasing motor when the brakes are to be released, a common manually operable means for actuating both said brake-applying pump and said brake lock-releasing pump, mechanical actuating force transmission means between said manual actuating means and said pumps, said transmission means comprising a housing, a spindle in said housing having a screw-threaded extended portion, and having a nut portion provided with a central screw-threaded bore, means for restraining said spindle against longitudinal sliding movement in said housing, a slidable spindle having a screw-threaded extension engaging the screw threads of said nut, said slidable spindle having an outwardly extending flange engaging with one face the piston of the lock-releasing pump, the piston of the braking pressure pump having a shank provided with screw threads engaging the screw thread of the extending portion of the non-slidable spindle, the pressure existing in the brake-applying pump being applied to the screw connection between the non-slidable spindle and the shank of the piston of said brake-applying pump and the pressure in the brake-releasing pump being applied to the screw connection between the slidable spindle and the nut of the non-slidable spindle, whereby the relative friction between said screw threads depends on the pressure in said pumps, means for applying the manual actuating force to the slidable spindle, whereby when a brake-releasing movement is applied to the actuating means the spindle threads to which the pressure of the brake-releasing motor is applied are moved first and the lock-releasing pump is actuated to apply pressure to the lock-releasing motor before the other screw-threaded spindle is actuated, whereby the brake lock is released before the braking pressure is released, and a spiral spring having one end connected to said spindle flange and the other connected to said nut, so that when the spindle flange rotates and moves away from the nut during a brake lock-releasing operation, the spiral spring is tensioned, and when the actuating force is released, said spring moves said flange and its spindle through a reverse movement.

ERWIN MAZUR.